United States Patent [19]
Takemori et al.

[11] Patent Number: 5,711,982
[45] Date of Patent: Jan. 27, 1998

[54] DE-LACTOSE MILK AND DE-LACTOSE MILK POWDER, AND FOODSTUFFS CONTAINING THE SAME AND PROCESS THEREFOR

[75] Inventors: Toshio Takemori, Tokyo; Masahiro Takagi, Saitama; Masanori Ito, Saitama; Tatsuya Kamiwaki, Saitama; Kiyoyasu Tsukada, Ibaraki; Ryohei Yamabe, Saitama, all of Japan

[73] Assignee: Lotte Co., Ltd., Tokyo, Japan

[21] Appl. No.: 785,763

[22] Filed: Jan. 21, 1997

[30] Foreign Application Priority Data

Jan. 18, 1996 [JP] Japan ................................. 8-006912
Jul. 25, 1996 [JP] Japan ................................. 8-196687

[51] Int. Cl.[6] .................... A23C 15/00; A23C 9/00; C12C 7/28; A23D 7/00
[52] U.S. Cl. .................... 426/580; 426/587; 426/588; 426/585; 426/601; 426/613; 426/657; 426/519; 426/522
[58] Field of Search .................... 426/580, 587, 426/588, 585, 601, 613, 657, 519, 522

[56] References Cited

U.S. PATENT DOCUMENTS 4,675,200 6/1987 Serpelloni et al. ................... 426/567
5,456,936 10/1995 Toonen ................................ 426/567

FOREIGN PATENT DOCUMENTS 0 195 365  9/1986  European Pat. Off. .
0 316 938  5/1989  European Pat. Off. .
2 084 185  4/1982  United Kingdom .
WO 93/02566  2/1993  WIPO .
WO 95/04469  2/1995  WIPO .

OTHER PUBLICATIONS

J. Gonzalez, "Preparation of lactose-free milk for nursing infants", Abstract, Database FSTA, XP002031143, 1971.

A. Pokrovskii, "Method of obtaining a lactose-free dry milk product", Abstract, Database FSTA, XP002031144, 1979.

AM USSR Nutrition, "Diet dry milk composition free lactose contain protein butter vegetable fat", Abstract, Database WPI, XP002031145, 1975.

Primary Examiner—Marian C. Knode
Assistant Examiner—Ali R. Salimi
Attorney, Agent, or Firm—Young & Thompson

[57] ABSTRACT

Major components of the de-lactose milk and the de-lactose milk powder according to the present invention may comprise a protein essentially consisting of milk protein and fats essentially consisting of milk fat but not include lactose of more than 2%. The de-lactose milk and the de-lactose milk powder are characterized by having a structure where the fat is emulsified with the protein.

20 Claims, No Drawings

DE-LACTOSE MILK AND DE-LACTOSE MILK POWDER, AND FOODSTUFFS CONTAINING THE SAME AND PROCESS THEREFOR

BACKGROUND OF THE INVENTION

The present invention relates to de-lactose milk and de-lactose milk powder which are reconstructed with milk proteins and milk fats as major components free or almost free of lactose, and to processes for producing the said de-lactose milk, and de-lactose milk powder.

The de-lactose milk and de-lactose milk powder according to the present invention may be used as substitutions by processed milk, whole milk powder and skimmilk powder for foodstuffs of confectioneries such as chocolate having milk flavour, candy, biscuit and the like, ice cream, sherbet, milk coffee and milk tea. Thus, the present invention also relates to the foodstuffs consisting of confectionery, beverage and ice which include the de-lactose milk and de-lactose milk powder.

In the present invention, foodstuffs means the confectioneries such as chocolate having milk flavour, candy and biscuit and the like, the ice such as ice cream and sherbet, and the drinks such as milk coffee and milk tea.

Hitherto, whole milk powder and skimmilk powder as components derived from fresh milk have been used for foodstuffs, for example, milk chocolate and ice cream spontaneously containing components from milk. In consideration of the antiobesity and promotion of the health, the foodstuffs are required to be low-calorie and sugar-less or sugar-free, wherein sugar-less foodstuffs mean foodstuffs in which contents of monosaccharides and disaccharides are less than 0.5%.

However, foregoing whole milk powder and skimmilk powder contain large amounts of lactose, for example, about 40% in whole milk powder and about 50% in skimmilk powder. Therefore, even if sugar derived from other materials is substituting with sugar alcohol, the resulting foodstuffs still contain considerable amounts of lactose. The commodities exist not only in Japan but also in foreign countries, although these are not sugar-less in the strict sense of word.

Processed milk and powdered milk of lactose free of or less content of lactose for satisfying the definition of "sugar-less" when used for the foodstuffs have never been reported. Thus, for example, in the field of chocolate, only black chocolate using sugar alcohol could satisfy the definition of "sugar-less".

Butter or casein protein may be used as substitutions for whole milk powder and skimmilk powder although they are not superior to whole milk powder and skimmilk powder in taste and feel even when applied for milk chocolate in their entireties.

SUMMARY OF THE INVENTION

It is, therefore, an objection of the invention to provide novel processed milk and powdered milk, or de-lactose milk and de-lactose milk powder free or almost free of lactose but may be used as the substitutes for whole milk powder, skimmilk powder, processed milk and the like, and the process for production thereof. Furthermore, the present invention provides the foodstuffs containing the de-lactose milk and/or the de-lactose milk powder obtained according to the invention. The foodstuffs containing the de-lactose milk and the de-lactose milk powder may satisfy the definition of sugar-less in the strict sense.

It is, therefore, another object of the invention to provide the foodstuffs which are not only low-calorie and sugar-less but also hold taste and feel of conventional foodstuffs with promoted health.

To achieve the foregoing objects, major components of the de-lactose milk and the de-lactose milk powder according to the present invention may comprise a protein essentially consisting of milk protein and fats essentially consisting of milk fat but not include lactose of more than 2%. The de-lactose milk and the de-lactose milk powder are characterized by having a structure where the fat is conjugated with the protein.

The protein which is one of major components of the de-lactose milk and the de-lactose milk powder according to the invention is preferably a milk protein derived from the fresh milk and include casein, albumin, WPC (whey protein concentrate) and the like. In proteins from the fresh milk, however, the most preferable proteins are TMP (total milk proteins) and the MPC (milk protein concentrate) which contain both casein and albumin rather than only casein or albumin. Proteins other than milk proteins, for example, soybean proteins may be used, although co-uses with milk proteins of more than 50% and further with milk flavour are required to enhance the milky taste. Thus, the protein which is one of major components of the de-lactose milk and the de-lactose milk powder according to the present invention comprises one or more of the aforementioned protein materials and contains milk proteins from the fresh milk of more than 50%.

The fat which is another major component of the de-lactose milk and the de-lactose milk powder of the present invention may preferably be of one or more milk fats from the fresh milk and selected from the group of fresh cream, butter and butter oil, and may optionally include vegetable fats, although milk fats from fresh milk of more than 50% may preferably be contained. When the fresh cream is selected as source of the fat, very small amount of lactose may be contained. When the butter and/or butter oil are used, lactose may not be contained. Thus, the de-lactose milk and the de-lactose milk powder free of lactose may be produced when the butter and/or butter oil are selected as source of the fat.

In the de-lactose milk and the de-lactose milk powder, ratio of the fat to the protein (F/P) may preferably be in the range from 0.33 to 3.0. Too much fat leads to substantially the same taste and feel as those of the butter only added to the foodstuffs, and too much protein, for example, used to chocolate leads to deterioration of the feel.

Milk ash may be contained as a trace of the de-lactose milk and the de-lactose milk powder according to the present invention. The preferable milk ash is milk serum mineral, although another mineral materials may be used.

The de-lactose milk and the de-lactose milk powder of the present invention may also include a bulking agent of soluble dietary fiber and/or sugar alcohol for the substitutes by lactose so as (i) to dry efficiently, (ii) to retain the taste, (iii) prevent the degradation of milk and (iv) to improve the feel when applied to chocolate and the like. As the bulking agent, the soluble dietary fiber such as polydextrose, inulin, indigestible dextrin and the like, the sugar alcohol such as lactitol, palatinit® (isomalt), maltitol, erythritol and the like or mixture thereof may be used. The bulking agent of soluble dietary fiber and/or sugar alcohol may optionally be added with content up to 2.5 of maximum ratio to total amount of the protein and the fat by weight, preferably from 0.5 to 2.5 when employed. If the content is more than 2.5, mixing amount is unpreferably limited. If the content is less than 0.5, an effect of the addition is not obtained.

One method of obtaining the de-lactose milk of the present invention comprises steps of suspending powders of the fat and the protein which are major components in aqueous solution for homogenization and of reconstructing a structure in which the fat is conjugated with the protein for obtaining a mixture of a stable O/W emulsion structure. Then, the emulsified mixture thus obtained is dried and pulverized to obtain the de-lactose milk of the present invention.

The foregoing bulking agent may be added to the step emulsifying the fat and protein in aqueous solution for obtaining the further stable O/W emulsion structure. The bulking agent also has a function of preforming a convenient pulverization when the de-lactose milk powder is produced. When the spray drying method is applied to the drying and powdering steps for pulverization, the bulking agent preferably contains at least polydextrose.

The foodstuffs containing the de-lactose milk and the de-lactose milk powder according to the present invention may be produced with use of the regular processes for producing the respective foodstuffs by employing the de-lactose milk and the de-lactose milk powder in substitution by skimmilk, whole milk powder and processed milk.

When the de-lactose milk and the de-lactose milk powder of the present invention are used for the sugar-less foodstuffs, one or more sugar alcohols selected from the group consisting of lactitol, palatinit® (isomaltitol) and maltitol may preferably be used as a sweetener. Those sugar alcohols have an effect of enhancing milk flavour of the foodstuffs. Furthermore, one or more compounds selected from the group consisting of the soluble dietary fiber such as polydextrose, inulin and indigestible dextrin, and sorbitol may additionally be used. The ratio of the sugar alcohol (including sorbitol when combined) to the soluble dietary fiber by weight may preferably be more than 0.5 and more preferably more than 1.

Further, when the de-lactose milk and the de-lactose milk powder according to the invention are used for sugar-less chocolate such as the low-calorie and/or low-carious sugar-less chocolate using erythritol and/or xylitol, not only the low-calorie and/or low-carious property may remain but also an improvement of sweetness may be obtained. The de-lactose milk containing the bulking agent according to the present invention may preferably be included with content of more than 5% by weight.

The de-lactose milk and the de-lactose milk powder of the present invention and the process for producing the foodstuffs according to the invention are not limited to those obtainable by the material and the method described hereinbefore, but every materials possessing equivalent compositions and structures may be available within the scope of the present invention.

The de-lactose milk and the de-lactose milk powder of the present invention may be prepared by:

(a) using fat including one or more milk fats selected from the group consisting of fresh cream, butter and butter oil; and (b) using protein including one or more Thai two milk protein selected from the group consisting of TMP, MPC, casein, casein salt and WPC; and by the processes of:

(c) homogenizing the said fat and the said protein in aqueous solution to the range from 0.33 to 3.0 ratio of the fat to the protein (F/P) for conjugation of the fat with the protein thereby to form a stable O/W emulsion structure; and in case of the de-lactose milk powder (d) drying and pulverizing the mixture obtained by the step (c) by the methods such as the spray dry and the freeze dry.

In the aforementioned step (c), the bulking agent of the soluble dietary fiber and/or the sugar alcohol may preferably be added with content up to 2.5 of maximum ratio to total solid amounts of protein and the fat by weight and more preferably from 0.5 to 2.5 in order to increase the stability of the O/W emulsion structure and facilitate the pulverization in case of the de-lactose milk powder used. The bulking agent preferably consists of one or more soluble dietary fibers and/or the sugar alcohols selected from the group consisting of polydextrose, inulin, indigestible dextrin, lactitol, maltitol, palatinit® and erythritol.

The de-lactose milk and the de-lactose milk powder according to the present invention may include the milk ash.

The foodstuffs containing the de-lactose milk and the de-lactose milk powder according to the present invention may be produced by the regular process with use of the de-lactose milk and the de-lactose milk powder in place of skimmilk, whole milk powder and processed milk.

PREFERRED EXAMPLES

The present invention will be described by the following Examples with reference to the comparisons and the contrasts. The following Examples should not be limitative but merely illustrative of the present invention. In the Examples, terms "%" and "part" represent "% by weight" and "part by weight", respectively unless otherwise denoted particularly.

Example 1

De-lactose Milk Powder Consisting of Milk Fat and Milk Protein (1) De-lactose milk powder A consisting of fresh cream and milk protein To 557 g of fresh cream of 47% fat was added 400 g of water and 276 g of TMP was further added with stirring at 2000 rpm for 10 minutes by means of the homomixer and was then emulsified. The mixture was concentrated by the rotary evaporator in a hot bath at 50° C. to reach 50% water, and the concentrate was freeze-dried by the freeze dryer to obtain 520 g of the powder forming the de-lactose milk powder A.

(2) De-lactose milk powder A' consisting of butter oil and milk protein

To 243 g of butter oil was added 680 g of water, and 276 g of TMP was further added with stirring at 2000 rpm for 10 minutes by means of the homomixer and was then emulsified. The mixture was concentrated by the rotary evaporator in a hot bath at 50° C. to reach 50% water, and the concentrate was freeze-dried by the freeze dryer to obtain 518 g of the powder forming the de-lactose milk powder A'.

(3) Unemulsified de-lactose milk powder A consisting of butter oil and milk protein The unemulsified de-lactose milk powder was produced by merely blending the fat and the protein without any emulsification in the aqueous solution. 520 g of butter oil and 540 g of TMP were mixed and stirred by the vertical mixer at medium speed for 10 minutes to obtain 1060 g of the powder forming the unemulsified de-lactose milk powder A.

(4) Comparison test: About a fat source of the testing de-lactose milk powder and a presence of the emulsification Chocolate was produced for trail using the de-lactose milk powders A, A' or the unemulsified de-lactose milk powder A described hereinbefore by the conventional process with the following recipe:

| | |
|---|---|
| cacao mass | 20 parts |
| milk powder | 12 parts |
| lactitol | 30 parts |
| polydextrose | 18 parts |
| cocoa butter | 19.5 parts |
| emulsifier | 0.5 parts |
| vanilla flavour | 0.1 part |
| aspartame | 0.1 part |

In production of the chocolate using the unemulsified de-lactose milk powder A, the rolling step was carried out for three times while usually once to obtain 30 micrometers of maximal particle diameter since milk protein is inconvenient for pulverization and likely forms the chocolate of large particle size.

Three kinds of chocolate thus produced were panel-tested by 20 persons with the following results.

TABLE 1

| | Answers | | |
|---|---|---|---|
| Questions | Chocolate containing the de-lactose milk powder A | Differ little | Chocolate containing the de-lactose milk powder A |
| Which is tastier? | 4 persons | 12 persons | 4 persons |
| Which feelings do you prefer? | 4 persons | 14 persons | 2 persons |
| Which aromas do you like? | 1 person | 17 persons | 2 persons |

| | Answers | | |
|---|---|---|---|
| Questions | Chocolate containing the de-lactose milk powder A | Differ little | Chocolate containing the nonemulsifying de-lactose milk powder A |
| Which is tastier? | 17 persons | 1 person | 2 persons |
| Which feelings do you prefer? | 18 persons | 2 persons | None |
| Which scents do you like? | 16 persons | 2 persons | 2 persons |

As shown in the upper column of Table 1, it was appeared that there was no substantial difference between tastes of the chocolates prepared for trail by using the de-lactose milk powder A and the de-lactose milk powder A'. Thus, the de-lactose milk powder of equivalent quality may be obtained even when fresh cream, butter oil, or butter obtainable by making butter oil from fresh cream is used as the fat source of the de-lactose milk powder.

As shown in the lower column of Table 1, it was appeared that taste, feel and flavor of the chocolate prepared with the de-lactose milk powder through the emulsification step is superior to that of the unemulsified de-lactose milk powder. Further, in case of using the unemulsified de-lactose milk powder, the rolling steps are required for three times with less productivity as hereinbefore described.

Example 2

De-lactose Milk Powder Containing the Bulking Agent

1) De-lactose milk powder B containing the bulking agent

To 600 g of fresh cream of 45.2% fat and 49.5% water was added 400 g of water and 10 g of the milk serum mineral salt was further added and mixed and stirred. 300 g of TMP and 450 g of polydextrose as the bulking agent were then added and the mixture was homogenzied at 2000 rpm for 10 minutes by means of the homomixer to prepare the de-lactose milk powder having a stable O/W emulsion structure. Then the de-lactose milk powder was dried by the spray dryer to obtain the powder having a composition of 2.9% water, 26.3% fat, 25.2% protein and 1.5% lactose which was mostly derived from the milk serum mineral, and of others such as dextrose and ash as guessed. The powder thus obtained forms the de-lactose milk powder B.

2) Unemulsified de-lactose milk powder B containing the bulking agent

The unemulsified de-lactose milk powder was produced by merely blending the fat and the protein without any emulsification in the aqueous solution. 260 g of butter oil of 100% fat, 260 g of TMP, 470 g of polydextrose and 10 g of the milk serum mineral salt were mixed and stirred by means of the vertical mixer at the low speed for 5 minutes and then at the medium speed for 5 minutes to obtain the powder as hereinbefore described. The composition of the powder obtained was 2.5% water, 26.1% fat, 24.2% protein and 0.3% lactose which was mostly derived from the milk serum mineral, and others like dextrose and ash as guessed. The powder forms the unemulsified de-lactose milk powder B.

3) Whole milk powder

The composition of the whole milk powder used as a contrast was 2.8% water, 26.5% fat, 25.3% protein and 39.5% lactose.

4) Comparison test: Comparison among the de-lactose milk powder obtained through the emulsifying step, the unemulsified de-lactose milk powder and the whole milk powder Chocolate was produced for trail by the conventional process with use of the de-lactose milk powders B, the unemulsified de-lactose milk powder B or the whole milk powder described hereinbefore with the following recipe:

| | |
|---|---|
| cacao mass | 20% |
| milk powder | 20% |
| lactitol | 20% |
| maltitol | 18% |
| cocoa butter | 20% |
| emulsifier | 0.3% |
| vanilla flavour | 0.1% |
| aspartame | 0.1% |

In the case using the unemulsified de-lactose milk powder B, the rolling steps were repeated for 3 times to obtain 30 micrometers of maximal particle diameter like the case of using the unemulsified de-lactose milk powder A as described hereinbefore since the roll-mill pulverizing efficiency was not sufficient. When the de-lactose milk powder B or the whole milk powder was used, there were some differences in the pulverizing efficiency which however falls within a range possible to cope by adjusting the pressure of rolling, and the single rolling step has caused no trouble.

Three kinds of chocolate thus produced were panel-tested by 50 female students of the high school with the following results.

TABLE 2

| Questions | Answers | | |
|---|---|---|---|
| | Chocolate containing the de-lactose milk powder B | Differ little | Chocolate containing the nonemulsifying de-lactose milk powder B |
| Which is tastier? | 40 persons | 8 persons | 2 persons |
| Which feelings do you prefer? | 45 persons | 4 persons | 1 person |
| Which scents do you like? | 35 persons | 10 persons | 5 persons |

| Questions | Answers | | |
|---|---|---|---|
| | Chocolate containing the whole milk powder | Differ little | Chocolate containing the nonemulsifying de-lactose milk powder B |
| Which is tastier? | 29 persons | 11 persons | 10 persons |
| Which feelings do you prefer? | 33 persons | 12 persons | 5 persons |
| Which scents do you like? | 30 persons | 12 persons | 8 persons |

| Questions | Answers | | |
|---|---|---|---|
| | Chocolate containing the de-lactose milk powder B | Differ little | Chocolate containing the whole milk powder |
| Which is tastier? | 20 persons | 15 persons | 15 persons |
| Which feelings do you prefer? | 23 persons | 5 persons | 22 persons |
| Which scents do you like? | 20 persons | 15 persons | 15 persons |

As shown in Table 2, the chocolate prepared by using the de-lactose milk powder B according the present invention was the tastiest in all of three trial chocolates.

The chocolate of the whole milk powder entailed some heating smell caused by the Maillard reaction of the free amino acid from the milk protein with the reducing sugar, while that of the de-lactose milk powder B made less heating smell. It was guessed that there was a difference of palatability between the chocolates of the de-lactose milk powder B and of the whole milk powder particularly in their scent (lower column of Table 2), as the heating smell affected the scent of the chocolates.

Example 3

White Chocolate with Use of the De-lactose Milk Powder

1) De-lactose milk powder C

To 650 g of butter (80.3% fat and 16.2% water) obtained by churning and centrifuging fresh cream of 45.5% fat and 49.2% water was added 1000 g of water, and 500 g of TMP, 20 g of the milk serum mineral and 2 g of sodium citrate were also added and mixed for the emulsification under the pressure of 120 kg/cm$^2$ to prepare a de-lactose milk of stable O/W emulsion structure. Then, the de-lactose milk was dried by the spray dryer to obtain a powder having the composition of 3.2% water, 48.3% fat and 46.6% protein and forming a de-lactose milk powder C.

2) Whole milk powder

The whole milk powder used as a contrast had the composition of 2.8% water, 26.5% fat, 25.3% protein and 39.5% lactose.

3) Comparison test: Comparison of white chocolates using the de-lactose milk powder C and the whole milk powder White chocolate was prepared for trail using the de-lactose milk powder C by the conventional process with the following recipe:

| | |
|---|---|
| milk powder | 11 parts |
| cocoa butter | 33.5 parts |
| lactitol | 24.9 parts |
| palatinit | 10 parts |
| polydextrose | 20 parts |
| emulsifier | 0.4 parts |
| vanilla flavour | 0.1 part |
| aspartame | 0.1 part |

On the other hand, another white chocolate was prepared for trail using the whole milk powder C by the conventional process with the following recipe:

| | |
|---|---|
| milk powder | 20 parts |
| cocoa butter | 33.5 parts |
| lactitol | 15.9 parts |
| palatinit | 10 parts |
| polydextrose | 20 parts |
| emulsifier | 0.4 parts |
| vanilla flavour | 0.1 part |
| aspartame | 0.1 part |

The panel-test for the two white chocolates prepared as hereinbefore described were carried out by 50 female students of the high school to obtain the following results.

TABLE 3

| Questions | Answers | | |
|---|---|---|---|
| | Sugar-less white chocolate containing the de-lactose milk powder C | Differ little | White chocolate containing the whole milk powder |
| Which is tastier? | 18 persons | 20 persons | 12 persons |
| Which feelings do you prefer? | 17 persons | 18 persons | 15 persons |
| Which scents do you like? | 22 persons | 13 persons | 15 persons |

As described in Table 3, the white chocolate using the de-lactose milk powder C was equivalent or tastier than that using the whole milk powder which had a milk flavor lacking in freshness on account of the heating smell of the milk per se (such as meillard smell, caramel smell) and the like.

On the other hand, the sugar-less white chocolate using the de-lactose milk powder C had less heating smell but provided a fresh milk taste.

The chocolate with use of sugar causes a specific body by synergistic effect of sweetness flavor derived from sugar itself and a heating smell of the whole milk powder for more favorite. The sugar-less chocolate with sugar alcohol, however, has mere or less cooling effect, and brings out a cool flavor of mints or citrus as well-known. Sugar alcohol incorporated with milk is used for foodstuffs in congenial to a milk flavor with freshness rather than a flavor having body. Thus, in case of manufacturing the sugar-less chocolate, it is preferable to use the de-lactose milk powder prepared by the process according to the present invention in order to retain the flavour of the sugar alcohol.

Example 4

De-lactose Milk Powder Containing the Bulking Agent

1) De-lactose milk powder D

To 650 g of butter (80.3% fat and 16.2% water) obtained by churning and centrifuging fresh cream of 45.5% fat and 49.2% water was added 1000 g of water, and 500 g of TMP, 20 g of the milk serum mineral and 3 g of sodium citrate were also added and mixed for emulsification under the pressure of 150 kg/cm² to prepare a de-lactose milk having a stable O/W emulsion structure. Then, the de-lactose milk was dried by the spray dryer to obtain a powder of the composition of 2.2% water, 48.9% fat and 46.8% protein forming a de-lactose milk powder D.

(2) De-lactose milk powder E containing polydextrose

To 650 g of butter (80.3% fat and 16.2% water) obtained by churning and centrifuging fresh cream of 45.3% fat and 49.5% water was added 1500 g of water and 20 g of the milk serum mineral was also added for mixture. 570 g TMP and 1230 g of polydextrose syrup were further added and carried out homogeniztion by the homomixer at 2000 rpm for 10 minutes to prepare a de-lactose milk powder having a stable O/W emulsion structure. Then, the de-lactose milk thus obtained was dried by the spray dryer to obtain a powder of the composition of 2.1% water, 26.2% fat, 25.1% protein and 0.3% lactose forming a de-lactose milk powder E.

(3) Comparison test: About presence of the polydextrose or a bulking agent in the de-lactose milk powder The following test was carried out so as to examine about an addition of the polydextrose when the de-lactose milk powder is prepared.

Chocolate was prepared for trail with use of the de-lactose milk powder D by the conventional process with the following recipe:

| | |
|---|---|
| cacao mass | 23 parts |
| milk powder D | 12 parts |
| cocoa butter | 20 parts |
| lactitol | 14 parts |
| polydextrose | 20.5 parts |
| erythritol | 10 parts |
| emulsifier | 0.3 parts |
| vanilla flavour | 0.1 part |
| aspartame | 0.1 part |

In case of preparing the chocolate with use of the de-lactose milk powder D, a maximal particle size of the trial chocolate arrived 35 micrometers at the rolling pressure of 17 kg/cm² with rough feel. Then, the rolling pressure was elevated to 22 kg/cm² for pulverization, so that a preparation of fine particle of less than 10 micrometers was relatively increased with drop of the treating capacity of the rolling mill.

On the other hand, another chocolate was produced for trail with use of the de-lactose milk powder D by the conventional process with the following recipe:

| | |
|---|---|
| cacao mass | 23 parts |
| milk powder E | 22 parts |
| cocoa butter | 20 parts |
| lactitol | 14 parts |
| polydextrose | 10.5 parts |
| erythritol | 10 parts |
| emulsifier | 0.3 parts |
| vanilla flavour | 0.1 part |
| aspartame | 0.1 part |

In case of preparing the chocolate with use of the de-lactose milk powder E, the pulverization could be carried out at the rolling pressure of 17 kg/cm² in the rolling step.

The following table shows the date of the rolling pressure, the treating capacity and the particle size of the trial chocolate in the rolling step for preparing chocolates in the tests.

TABLE 4

| Milk powder | Roll pressure (kgf/cm²) | Throughput (kg/hr) | Maximum particle size (μ) | Proportion of fine particles* |
|---|---|---|---|---|
| De-lactose milk powder D | 22 | 31.3 | 27 | Δ–x |
| De-lactose milk powder D | 17 | 39.1 | 35 | o |
| De-lactose milk powder E | 17 | 50.2 | 28 | ⊚ |

*⊚: Few, o: Nomal, Δ: More, x: Most

The panel-tests were carried out for the chocolates prepared with use of the de-lactose milk powder D through the rolling step at the rolling pressure of 22 kg/cm² and with use of the de-lactose milk powder E through the rolling step at the rolling pressure of 17 kg/cm² by 50 female students of the high school with the following results.

TABLE 5

| Questions | Chocolate containing the de-lactose milk powder D | Differ little | Chocolate containing the de-lactose milk powder E |
|---|---|---|---|
| Which is tastier? | 15 persons | 20 persons | 22 persons |
| Which feelings do you prefer? | 12 persons | 13 persons | 25 persons |
| Which scents do you like? | 10 persons | 25 persons | 15 persons |

The results showed that it was preferable to add the polydextrose when the de-lactose milk powder is prepared. It was guessed that the powder of a particle structure of the polydextrose entangled with the protein is rather tolerated than that of a particle structure comprising only the protein conjugating the fat when pulverized.

The difference in the palatability of the feel in the panel-tests was likely resulted from the fact that the proportion of the fine particle of less than 10 micrometers was rather greater in the chocolate prepared with use of the de-lactose milk powder D through the rolling step at the rolling pressure of 22 kg/cm² than the chocolate prepared with use of the de-lactose milk powder E through the rolling step at the rolling pressure of 17 kg/cm². When the chocolate is prepared with use of the de-lactose milk powder, the rolling pressure is compelled to increase in order to obtain the maximal particle size of less than 30 micrometers, resulting in increment of the proportion of fine particle while drop of the treating capacity of the rolling mill. The increment of the proportion of fine particle in the chocolate would lead to increment of the viscosity of the chocolate with unfavorable property of tardiness in mouth. In this point of view, it was found preferable to use polydextrose (or a replaciable bulking agent) when the de-lactose milk powder is prepared.

Example 5

De-lactose Milk Powder Containing the Bulking Agent of Various Amounts

According to the result of Example 4 as hereinbefore described, it was appeared that an addition of a bulking agent such as polydextrose when the de-lactose milk powder is prepared affects to the capacity of the preparation of the chocolate but also the quality, more particularly its feel of the chocolate. An upper limit of the quantity of the bulking agent to be used for the chocolate has been examined.
(1) De-lactose milk powders F–K Fresh cream of 45% fat and 49.5% water was churned and centrifuged at 2000 rpm for 10 minutes to obtain butter (80.2% fat and 15.3% water) to prepare butter oil to be a raw material for the de-lactose milk powder which was then subjected to a further centrifugation.

Lactitol and polydextrose with a ratio of 1:1 were well mixed and added with water for 40% concentration to prepare a syrup as a bulking agent.

24000 g of water was added to 800 g of the butter oil as described hereinbefore and 800 g of TMP for sufficient mixing. Then, the syrup prepared was added with one of the contents selected from 0 g, 800 g, 1600 g, 2400 g, 3200 g and 4000 g for mixing and emulsifying under the pressure of 150 kg/cm$^2$, and then dried and pulverized by the spray dryer to obtain the de-lactose milk powders of six types forming the de-lactose milk powders F, G, H, I, J and K, respectively.
(2) Examination of the contents of the bulking agents in the de-lactose milk powders Results of the examinations about ratio by weight of the bulking agent (a syrup of lactitol and polydextrose with 1:1 ratio) against the total weight of the fat and the protein (E/D), facilities of pulverization with respect to the de-lactose milk powders f to K as hereinbefore described are shown in following Table 6.

TABLE 6

| Milk powder | Sum of fat and protain D (g) | Lactitol polydextrose syrup E (g) | E/D ratio | Powderizating condition |
| --- | --- | --- | --- | --- |
| De-lactose milk powder F | 1600 | 0 | 0 | There is no problem with the powderization. |
| De-lactose milk powder G | 1600 | 800 | 0.5 | Good powderizing. |
| De-lactose milk powder H | 1600 | 1600 | 1.0 | Good powderizing. |
| De-lactose milk powder I | 1600 | 2400 | 1.5 | Good powderizing. |
| De-lactose milk powder J | 1600 | 3200 | 2.0 | Slightly down the drying rate. |
| De-lactose milk powder K | 1600 | 4000 | 2.5 | Slightly down the drying rate. |

Increment of a value E resunts in lowering of a fly efficiency of water in the pulverization step as shown in Table 6. When the E/D exceeds over 2.5, there was no substantial influence on quality of the chocolate even there may be caused a mere problem of restricting a degree of compounding in the preparation of the chocolate. Preferable E/D ratio was less than 2.5.

Example 6

Examination of Ratio of the Fat to the Protein (F/P Ratio) in the De-lactose Milk Powder (1) De-lactose milk powders L–T Fresh cream of 45.2% fat and 49.8% water was churned to obtain butter of 81.3% fat and 15.8% water and then the butter was centrifuged at 3000 rpm for 10 minutes to prepare butter oil of 100% fat.

3000 g of water was measured and the protein (MPC) determined in quantities to the range from 300 g to 1700 g (9 grades) was added for solubilization with stirring at 500 rpm for 5 minutes. Then, defined quantity of the butter oil as hereinbefore described was added as the fat for homogenization at 2000 rpm so that a total weight of the fat with the protein as previously added is 2000 g and then homogenized for ten minutes and emulsified. Dries and pulverization by the spray dryer were then carried out to obtain nine types of the milk powders or de-lactose milk powders L, M, N, O, P, Q, S and T which were prepared by addition of 300 g, 500 g, 667 g, 800 g, 1000 g, 1200 g, 1333 g, 1500 g and 1700 g, respectively.
(2) Comparison test Chocolates were prepared for trial with use of the de-lactose milk powders L to S prepared in the above (1) for examination about an influence by the ratio of the fat to the protein (F/P ratio) in the de-lactose milk powder against the stability of O/W emulsion structure, the milk flavour, the qualifications for processing and the taste when chocolate prepared.

Chocolates were prepared for trail with use of the conventional processes with the following recipe:

| | |
| --- | --- |
| cacao mass | 15% |
| milk powder | 22% |
| palatinit | 20% |
| maltitol | 10% |
| erythritol | 10% |
| inulin | 5% |
| cocoa butter | 22.5% |
| emulsifier | 0.3% |
| vanilla flavour | 0.1% |
| aspartame | 0.1% |

The protein quantity, the fat quantity, the E/P ratio, the milk flavour of the milk powder and the taset of the chocolate as the product were shown as follows.

TABLE 7

| Items Milk powder | Fats (g) | Proteins (g) | F/P ratio | Quantity of add water (g) | Emulsification stability | Milk flavor | Chocolate production aptitude | Milk flavour at chocolate |
|---|---|---|---|---|---|---|---|---|
| De-lactose milk powder L | 300 | 1700 | 0.18 | 3000 | Stable | Lose | Bad | Weak |
| De-lactose milk powder M | 500 | 1500 | 0.33 | 3000 | Very stable | Slightly lose | Slightly bad | Slightly Weak |
| De-lactose milk powder N | 667 | 1333 | 0.50 | 3000 | Very stable | Slightly good | Common | Common |
| De-lactose milk powder O | 800 | 1200 | 0.67 | 3000 | Very stable | Good | Common | Good |
| De-lactose milk powder P | 1000 | 1000 | 1.00 | 3000 | Stable | Good | Good | Good |
| De-lactose milk powder Q | 1200 | 800 | 1.50 | 3000 | Stable | Good | Good | Good |
| De-lactose milk powder R | 1333 | 667 | 2.00 | 3000 | Common | Slightly good | Good | Common |
| De-lactose milk powder S | 1500 | 500 | 3.00 | 3000 | Slightly unstable | Slightly lose | Good | Slightly butter smell |
| De-lactose milk powder T | 1700 | 300 | 5.60 | 3000 | Unstable | Lose | Common | Strong butter smell |

The protein contributes to stabilize the O/W emulsion structure and to keep the milk flavour with conjugation of the fat therein. It was unpreferable to reduce the E/F ratio, for example, into less than 0.33 in order to cause the milk flavour since the milk flavour is mainly derived from butter. When the protein is increased, then an over-load is applied to the roll in the rolling mill step resulting in a reduction in productivity and variation of the particle size with deterioration in feel of the chocolate. In contrast, if E/P ratio is increased to, for example, over 3.0, then the free fat is increased with increment of the butter smell when the milk powder is stored whereby the milk flavour is deteriorated. The butter smell becomes greater than its freshness, for which reason there is no longer merit of reconstruction of the de-lactose milk powder. If anything, in the light of keeping the milk flavour, it would be preferable that the de-lactose milk powder was prepared to obtain an optimal F/P ratio (which may be estimated near 1) before the milk fat (butter oil) is separately added in preparing a chocolate due to less off flavour of the milk powder.

Thus, it was found that the E/P ratio of the de-lactose milk powder (the de-lactose milk) is preferable in the range from 0.33 to 3.0.

Example 7

Chocolate With Use of the De-lactose Milk Powder Containing Sugar Alcohol (1) Preparation for trial of a chocolate Chocolates including various sugar alcohols as sweeteners were prepared for trail with use of the de-lactose milk powder E made in Example 4-2) by the conventional process with the following recipe:

| | |
|---|---|
| cacao mass | 20% |
| de-lactose milk powder E | 20% |
| sugar alcohols | 39.5% |
| cocoa butter | 20% |
| lecithin | 0.5% |
| vanillin | adequate amount |
| aspartame | adequate amount |

The chocolates with use of lactitol as a sugar alcohol, palatinit, maltitol, sorbitol, xylitol, erythritol, polydextrose, inulin and indigestible dextrin form the chocolate 1, the chocolate 2, the chocolate 3, the chocolate 4, the chocolate 5, the chocolate 6, the chocolate 7, the chocolate 8 and the chocolate 9, respectively.

(2) Comparison tests: Examination about sugar alcohols using for sugar-less chocolates with use of the de-lactose milk powder When a sugar-less chocolate is prepared with use of the de-lactose milk powder, sugar alcohol is preferably used to enhance its milk flavour.

For examinations of which sugar alcohols is preferable, evaluation tests of the chocolates containing a sugar alcohol with use of the de-lactose milk powder E prepared in Example 4-2) as hereinbefore described were carried out by 10 panelists. The evaluation was carried out with use of the 100 points full marks scoring method which judges 50 points as standard and more than 70 points as good. Results obtained were shown in the following table.

TABLE 8

| | | Items for mark | | | | |
|---|---|---|---|---|---|---|
| Chocolates | Contained sugar alcohol | Milk impression | Sweetness | Feelings | General grade | A short review |
| Chocolate 1 | Lactitol | 85 | 82 | 88 | 84 | The milk impression is good. |
| Chocolate 2 | Palatinit ® | 78 | 75 | 62 | 70 | The milk impression is good. |
| Chocolate 3 | Maltitol | 72 | 77 | 68 | 75 | Well balanced the milk impression and the sweetness. |

TABLE 8-continued

| Chocolates | Contained sugar alcohol | Milk impression | Sweetness | Feelings | General grade | A short review |
|---|---|---|---|---|---|---|
| Chocolate 4 | Sorbitol | 42 | 55 | 60 | 62 | A cooling impression muffle the milk impression. |
| Chocolate 5 | Xylitol | 46 | 68 | 68 | 65 | There are good feeling between sweetness matters. |
| Chocolate 6 | Erythritol | 38 | 58 | 70 | 55 | Taste bitter. |
| Chocolate 7 | Polydextrose | 60 | 52 | 55 | 58 | Milk impression and bad feeling. |
| Chocolate 8 | Inulin | 58 | 48 | 52 | 55 | The feeling is bad. |
| Chocolate 9 | Indigestible dextrin | 52 | 45 | 51 | 50 | The feeling is bad. |

According to the results of Table 8, it was found that the use of lactitol, palatinit and maltitol were preferable in the light of the enhancement of the milk flavour. The use of polydextrose or inulin alone causes a deterioration of feel. It has, however, been known that the feel was improved by co-use with a low hygroscopic sugar alcohol such as lactitol or palatinit and it is preferable to use thus polydextrose or inulin together with them.

Example 8

De-lactose Milk (1) De-lactose milk U and de-lactose milk powder U 650 g of butter (80.3% fat and 16.2% water) obtained by churning and centrifuging fresh cream of 45.3% fat and 49.5% water was added with 1500 g of water and 20 g of the milk serum mineral was also added and mixed. 570 g of TMP and 1230 g of polydextrose syrup were further added for homogenization at 2000 rpm for 10 minutes to prepare the de-lactose milk having a stable O/W emulsion structure as a de-lactose milk U. Then, a part of the de-lactose milk is collected to be dried and pulverized by the spray dryer to obtain a de-lactose milk powder U. The powder was the composition of 2.1% water, 26.2% fat, 25.1% protein and 0.3% lactose.

(2) Sugar-less milk soft candy with use of the de-lactose milk U

Sugar-less milk soft candy with use of the de-lactose milk U prepared in the above (1) as hereinbefore described was prepared with the following recipe:

| | |
|---|---|
| palatinit | 20 parts |
| maltitol | 20 parts |
| De-lactose milk U (49.7% water) | 20 parts |
| polydextrose syrup | 55 parts |
| charge water | 20 parts |
| vegetable oil | 5 parts |
| emulsifier | 0.1 part |
| vanilla flavour | 0.1 part |

Palatinit, maltitol and polydextrose syrup were mixed with the charge water at 70° C. to be dissolved. Then, the de-lactose milk U, the vegetable oil and the emulsifier were added and mixed for uniform dispersion. The mixed solution thus obtained was then condensed under a reduced pressure to reach 7% moisture so that a flavour is added in soft dough and then cooled to have an appropriate hardness for a bite size shaping in order to obtain a sugar-less milk soft candy.

(3) Sugar-less milk soft candy with use of the de-latose milk powder U

Sugar-less milk soft candy was prepared for trail with use of the de-lactose milk powder U prepared in the above (1) with the same recipe and by the same process in the above (2). The de-lactose milk powder U was reduced with the same weight of water for substitution for the de-lactose milk in the above (2).

(4) Sugar-less ice used the de-lactose milk U

Sugar-less ice was prepared with use of the de-lactose milk U prepared in (1) as hereinbefore described with the following recipe:

| | |
|---|---|
| salt-free butter | 12 parts |
| calcium caseinate | 2 parts |
| De-lactose milk U | 12 parts |
| maltitol | 10 parts |
| polydextrose | 5 parts |
| reduced starch syrup | 10 parts |
| stevia (high performance sweetener) | 0.05 parts |
| emulsification stabilizer | 0.5 parts |
| salts | 0.5 parts |
| vanilla flavour | 0.2 parts |
| carotenoids | adequate amount |
| water | 100 parts as a total quantity with the above compositions |

Calcium caseinate, de-lactose milk U, maltitol, polydextrose reducing starch syrup, high performance sweetener and salts were dissolved in water. Salt-free butter and the emulsification stabilizer were further added by heating to 65° C. and homogenized by the homogenizer at 150 kg/cm$^2$ by weight for forming a stable O/W emulsion structure. After disinfection at 85° C. for 30 seconds and cooled to 4° C., the flavour and carotenoids were added. Then, a freezing was carried out at −4.5° C. with 80% of overrun and charged into cups for the final hardening to −18° C. in order to obtain a sugar-less ice as a final product.

(5) Sugar-less ice with use of the de-lactose milk powder U

Sugar-less ice with use of the de-lactose milk powder U was obtained by the same recipe and the process similar to those of (4) as hereinbefore described except use of 6 parts of the de-lactose milk powder U prepared in (1) as hereinbefore described for replacement by 12 parts of the de-lactose milk powder U.

(6) Comparison tests: Comparison between the products with use of the de-lactose milk and the products with use of the de-lactose milk powder Panel tests were carried out for the foodstuffs as prepared for trail in (2)–(5) in order to determine a presence of the difference in qualities of the products between the product with use of the de-lactose milk or the product with use of the de-lactose milk powder.

The sugar-less milk soft candies of (2) and (3) as hereinbefore described were tested by 10 panelists and the sugar-less ices of (4) and (5) as hereinbefore described were tested by 12 panelists. Results were shown in the following table.

TABLE 9

| Questions | Answers | | |
|---|---|---|---|
| | Sugar-less milk soft candy containing the de-lactose milk U | Differ little | Sugar-less milk soft candy containing the de-lactose milk powder U |
| Which is tastier? | 1 person | 8 persons | 1 person |
| Which sweetness do you like? | 2 persons | 7 persons | 1 person |
| Which scents do you like? | 1 person | 7 persons | 2 persons |

| Questions | Answers | | |
|---|---|---|---|
| | Sugar-less ice containing the de-lactose milk U | Differ little | Sugar-less ice containing the de-lactose milk powder U |
| Which is tastier? | 2 persons | 9 persons | 1 person |
| Which sweetness do you like? | 2 persons | 7 persons | 3 persons |
| Which scents do you like? | 2 persons | 8 persons | 2 persons |

According to the results of Table 9, no difference was found in quality between the products obtained with use of the de-lactose milk and the products obtained with use of the de-lactose milk powder according to the present invention.

(7) Evaluation test of quality

The sugar-less milk soft candy and the sugar-less ices of (2)–(5) as hereinbefore described were finished as the products having a fresh milk body matching for sugar alcohol specific plain sweetness. About the sugar-less milk soft candies and the sugar-less ices, the evaluation test was carried out with use of scoring by the panelists as similar to the above panel test. Results were shown in the following table.

TABLE 10

| | 5 | 4 | 3 | 2 | 1 |
|---|---|---|---|---|---|
| Sugar-less milk soft candy | | | | | |
| Quality of taste | 5 persons | 4 persons | 1 person | None | None |
| Quality of sweetness | 6 persons | 4 persons | None | None | None |
| Milk flavor | 5 persons | 5 persons | None | None | None |
| Sugar-less ice | | | | | |
| Quality of taste | 6 persons | 5 persons | 1 person | None | None |
| Quality of sweetness | 5 persons | 5 persons | 2 persons | None | None |
| Milk flavor | 6 persons | 6 persons | None | None | None |

5: Very good,
4: Good,
3: Normal,
2: Bad,
1: Very bad

Example 9

Sugar-less Chocolate with Use of the De-lactose Milk Powder Containing Sugar Alcohol and Soluble Dietary Fiber Sweetener using for a sugar-less chocolate is restricted to sugar alcohols or dietary fibers. However, problems such as (i) the rough feel of chocolate and (ii) the laxation because of stronger laxative effect are occurred when sugar alcohol only is used as a sweetener.

The use of the de-lactose milk and the de-lactose milk powder according to the present invention is one of effective ways in order to solve those problems. Co-use of a soluble dietary fiber with a sugar alcohol is also effective.

A sequential change of feeling, when the sugar alcohol was used, resulted in the continuous linking with water in the chocolate the to form the rough and large sugar alcohol particles. Thus, the degradation of feeling is prevented by reducing a quantity of the addition of sugar alcohol and by providing an amorphous soluble dietary fiber in order to trap the free water and dissociate the sugar alcohol particles. Although use of a vegetable oil or an emulsifying agent may be effective when the subject is restricted to feeling only, the soluble dietary fiber is preferably used in the sugar-less chocolate to prevent the laxative effect positively.

Thus, a test was carried out to determine a ratio of a sugar alcohol to soluble dietary fiber by weight (SA/SDF) which are used as sweeteners for the sugar-less chocolate.

(1) Preparation of sugar-less chocolates with various ratios of SA/SDF

Eight types of sugar-less chocolates with the SA/SDF ratios in the range from 0.34 to 4.44 were prepared by varying quantities of palatinit and polydextrose by recipes in the following table. Use was made of the de-lactose milk powder E prepared in Example 4-2) as hereinbefore described to obtain chocolates 10–17.

TABLE 11

| Chocolates | 10 | 11 | 12 | 13 | 14 | 15 | 16 | 17 |
|---|---|---|---|---|---|---|---|---|
| SA/SDF ratio | 0.34 | 0.50 | 0.69 | 1.00 | 1.05 | 2.16 | 3.26 | 4.44 |
| Cacaomass | 20 | 20 | 20 | 20 | 20 | 20 | 20 | 20 |
| De-lactose milk powder E | 20 | 20 | 20 | 20 | 20 | 20 | 20 | 20 |
| Cocoa butter | 19.5 | 19.5 | 19.5 | 19.5 | 19.5 | 19.5 | 19.5 | 19.5 |
| Palatinit | 12.5 | 16.3 | 20.0 | 24.5 | 29.0 | 33.5 | 37.5 | 40.0 |
| Polydextrose | 27.5 | 23.7 | 20.0 | 15.5 | 11.0 | 6.5 | 2.5 | 0.0 |
| Emulsifier | 0.3 | 0.3 | 0.3 | 0.3 | 0.3 | 0.3 | 0.3 | 0.3 |
| Vanilla flavour | 0.1 | 0.1 | 0.1 | 0.1 | 0.1 | 0.1 | 0.1 | 0.1 |
| Aspartame | 0.1 | 0.1 | 0.1 | 0.1 | 0.1 | 0.1 | 0.1 | 0.1 |

(2) Evaluation test: Examination of the SA/SDF ratios in the sugar-less chocolates Evaluation test of the chocolates prepared for trial with the recipes as hereinbefore described was carried out with scoring (100 points of full marks scoring and standard score of 50 points) by 10 panelists. Results were shown in the following table.

TABLE 12

| Chocolates | SA/SDF ratio | Grades | | | |
|---|---|---|---|---|---|
| | | Milk flavor | Quality of sweetness | Feelings | Total grade |
| 10 | 0.34 | 68 | 70 | 51 | 55 |
| 11 | 0.50 | 70 | 71 | 65 | 65 |
| 12 | 0.69 | 72 | 73 | 70 | 70 |
| 13 | 1.00 | 74 | 75 | 75 | 75 |
| 14 | 1.45 | 78 | 76 | 83 | 81 |
| 15 | 2.16 | 78 | 78 | 82 | 79 |
| 16 | 3.26 | 77 | 76 | 78 | 72 |
| 17 | 4.44 | 77 | 74 | 63 | 65 |

According to the results of table 12, it was founded that the SA/SDF ratio in the sugar-less chocolate was preferably more than 0.5.

19

Example 10

Application of the De-lactose Milk Powder for a Sugar-less Chocolate with Low Calorie and/or Low Carious with Use of Erythritol and/or Xylitol

A calorie of erythritol is considerably low since the calorie of erythritol is 0 kcal/g and calories of other sugar alcohols are almost 2 kcal/g. Consumers' needs against the low calorie sugar-less chocolate using the quality of low calorie are high. Xylitol is a sugar alcohol having an anti-carious effect and consumers' needs against the low carious sugar-less chocolate with use of xylitol as a sugar alcohol in a view of the prevention of carious are also great.

However, these two sugar alcohols entail pungency in throat caused by the cooling tast with a function of enhancing miscellaneous taste which are disadvantageous to qualities of taste of the chocolate.

Thus, the de-lactose milk powder according to the present invention was applied to a sugar-less chocolate of low calorie and/or low carious with use of erythritol and/or xylitol to find that the de-lactose milk powder has an effect of improving the disadvantageous tastes of erythritol and xylitol to the chocolate. Examples are shown hereinafter.

(1) Application of the de-lactose milk powder to a low calorie sugar-less chocolate with use of erythritol Low calorie sugar-less chocolates with use of erythritol including respectively 0%, 5%, 10% or 15% of the de-lactose milk powder E prepared in Example 4 (2) were prepared for trial to obtain the chocolates 18–21, respectively.

TABLE 13

| Chocolates | 18 | 19 | 20 | 21 |
| --- | --- | --- | --- | --- |
| De-lactose milk powder content | 0% | 5% | 10% | 15% |
| Cacao mass | 20 | 20 | 20 | 20 |
| De-lactose milk powder E | 0 | 5 | 10 | 15 |
| Cocoa butter | 25.0 | 24.7 | 23.4 | 22.1 |
| Erythritol | 40 | 40 | 40 | 40 |
| Emulsifier | 0.4 | 0.4 | 0.4 | 0.4 |
| Vanilla flavor | 0.1 | 0.1 | 0.1 | 0.1 |
| Palatinit | 14.45 | 10.25 | 6.05 | 2.35 |
| Aspartame | 0.05 | 0.05 | 0.05 | 0.05 |

Taste of the four types of chocolates prepared with recipes described in Table 13 was checked by 10 panelists. The pungency in throat and miscellaneous taste were scored by comparison when a score of the chocolates with use of 0% de-lactose milk powder was to be 100 points. Thus, the lower the points was more preferable. The results were shown in the following table.

TABLE 14

| Chocolates | De-lactose milk powder content | A feeling of bite in throat | A miscellaneous taste of cacao | Total grades |
| --- | --- | --- | --- | --- |
| 18 | 0% | 100 | 100 | Bad |
| 19 | 5% | 61 | 62 | Normal |
| 20 | 10% | 52 | 42 | Slightly good |
| 21 | 15% | 42 | 38 | Good |

According to the results of Table 14, it was found that the pungency in throat and the miscellaneous taste of cacao in the low calorie sugar-less chocolates with use of erythritol were improved by using the de-lactose milk powder of the present invention and the chocolates were more improved. It was further found that when 20% cacao mass and 40% erythritol were compounded, the effect was obtained by addition of 5% de-lactose milk powder and more remarkable effect was obtained by addition of more than 10% de-lactose milk powder.

(2) Application of the de-lactose milk powder for a low carious sugar-less chocolate with use of xylitol or dietary fibers. However, g Anti-carious sugar-less chocolates with use of xylitol respectively including 0%, 5%, 10% or 15% de-lactose milk powder E prepared in Example 4-2) were prepared for trial to form the chocolates 22–25, respectively.

TABLE 15

| Chocolate | 22 | 23 | 24 | 25 |
| --- | --- | --- | --- | --- |
| De-lactose milk powder content | 0% | 5% | 10% | 15% |
| Cacao mass | 20 | 20 | 20 | 20 |
| De-lactose milk powder E | 0 | 5 | 10 | 15 |
| Cocoa butter | 25.0 | 24.7 | 23.4 | 22.1 |
| Xylitol | 40 | 40 | 40 | 40 |
| Emulsifier | 0.4 | 0.4 | 0.4 | 0.4 |
| Vanilla flavor | 0.1 | 0.1 | 0.1 | 0.1 |
| Palatinit | 14.5 | 10.3 | 6.1 | 2.4 |

Taste of the four chocolates prepared with recipes of Table 15 were checked by 10 panelists as well as (1) as hereinbefore described. Results were shown in the following table.

TABLE 16

| Chocolates | De-lactose milk content | A feeling of bite in throat | A miscellaneous taste of cacao | Total grades |
| --- | --- | --- | --- | --- |
| 22 | 0% | 100 | 100 | Bad |
| 23 | 5% | 59 | 54 | Normal |
| 24 | 10% | 47 | 40 | Slightly good |
| 25 | 15% | 38 | 35 | Good |

According to the results of Table 16, it was found that the anti-carious sugar-less chocolates with use of xylitol provided more improved chocolate by using of the de-lactose milk powder. It was further found that when 20% cacao mass and 40% erythritol were compounded, the effect was obtained by addition of 5% de-lactose milk powder and the remarkable effect was obtained by addition of more than 10% de-lactose milk powder.

Example 11

De-lactose milk powder including a fat except the milk fat and including a protein except the milk protein

In the de-lactose milk and is the de-lactose milk powder of the present invention, the milk fat as a source of fat and the milk protein as a source of protein are preferably used, but to determine a substitutability of ones not derived from the fresh milk by parts of the fat and protein, the de-lactose milk powder including a fat and a protein except the milk fat and the milk protein was prepared.

(1) De-lactose milk powder V including cocoa butter and soybean protein 400 kg of butter oil, 200 kg of cocoa butter, 250 kg of TMP, 50 kg of sodium caseinate, 200 kg of soybean protein, 728 kg of polydextrose, 20 kg of milk ash mineral salt and 2 kg of sodium citrate were added to 2730 kg of water with stirring, and mixed and emulsified under the pressure of 120 kg/cm² to obtain a mixture having a stable emulsion structure and further dried by spray dryer to obtain a powder forming the de-lactose milk powder V.

(2) Unemulsified de-lactose milk powder V including cocoa butter and soybean protein Without emulsifying the fat and the protein in the aqueous solution, the blending thereof only was used to prepare the unemulsified de-lactose milk powder. 400 kg of butter oil, 200 kg of cocoa butter, 250 kg of TMP, 50 kg of sodium caseinate, 200 kg of soybean protein, 728 kg of polydextrose, 20 kg of milk ash mineral salt and 2 kg of sodium citrate were blended to obtain a powder as the unemulsified de-lactose milk powder V.

(3) Comparison and Evaluation test: De-lactose milk powder including a fat and a protein not derived from fresh milk Chocolate was prepared for trail with use of the de-lactose milk powder V or the unemulsified de-lactose milk powder V as hereinbefore described by the conventional process with the following recipe:

| | |
|---|---|
| cacao mass | 16 parts |
| cocoa butter | 21.8 parts |
| milk powder | 22 parts |
| maltitol | 39.65 parts |
| emulsifier | 0.4 parts |
| milk flavour | 0.1 part |
| aspartame | 0.05 parts |

Panel tests were carried out by 10 panelist about taste of two types of the chocolates accordingly prepared and the following results were obtained.

TABLE 17

| | Answers | | |
|---|---|---|---|
| Questions | Chocolate containing the de-lactose milk powder V | Differ little | Chocolate containing the non-emulsified de-lactose milk powder V |
| Which is tastier? | 9 persons | 1 person | None |
| Which feelings do you prefer? | 10 persons | None | None |
| Which scents do you like? | 7 persons | 3 persons | None |

As shown in the above table, the chocolate with use of the de-lactose milk powder V prepared through the emulsification step was more excellent in taste, feel and flavour. When the chocolate was prepared with use of the unemulsified de-lactose milk powder V, the pulverization in the rolling step is considerably inferior as compared with preparation of a general chocolate and the chocolate with use of the de-lacatose milk powder V, for which reason a difference in the feel appears.

Evaluation test of quality was carried out to the chocolates with use of the de-lactose milk powder V by the same 10 panelist as hereinbefore described and the results were shown in the following table.

TABLE 18

| | 5 | 4 | 3 | 2 | 1 |
|---|---|---|---|---|---|
| Quality of taste | 4 persons | 5 persons | 1 person | None | None |
| Quality of sweetness | 3 persons | 5 persons | 2 persons | None | None |
| Milk flavor | 4 persons | 6 persons | None | None | None |

5: Very good,
4: Good,
3: Normal,
2: Bad,
1: Very bad,

When the soybean protein was used, although a specific grassy smell of the soybean protein was anxious, the grassy smell was decreased by co-use with the milk protein. According to Table 18 as hereinbefore shown, it was found that there is no problem for foodstuffs to use the de-lactose milk powder with partly use of the fat and/or protein underived from fresh milk.

Example 12

(1) Biscuit with use of the de-lactose milk

Sugar-less biscuit with use of the de-lactose milk was prepared with the following recipe:

| | |
|---|---|
| weak flour | 100 parts |
| lactitol | 15 parts |
| erythritol | 5 parts |
| polydextrose | 5 parts |
| shortening | 25 parts |
| egg | 10 parts |
| de-lactose milk powder U | 15 parts |
| sodium bicarbonate (inflating agent) | 1.5 parts |
| salt | 1 part |
| vanilla flavor | 0.1 part |
| stevia (high performance sweetener) | 0.15 parts |
| water | 2 parts |

Lactitol, erythritol, polydextrose, the high performance sweetener, the de-lactose milk powder U and vanilla flavour were well mixed with the shortening and dispersed for subsequent mixing of eggs, salt dissolved in the water and the inflating agent and creaming up to reach 0.75 specific gravity before the flour was finally added in order to prepare a dough.

The dough was shaped in any shape for baking at 200° C. for 12 minutes in order to obtain a sugar-less biscuit.

(2) Biscuit with use of the de-lactose milk powder

Sugar-less biscuit was prepared with use of the de-lactose milk powder U in the same recipe and by the same process. The de-lactose milk powder U was added so as to be equivalent to the solid content included in the de-lactose milk U and the moisture was adjusted by increasing the addition of water.

(3) Comparison test: Comparison of a product with use of the de-lactose milk to a product with use of the de-lactose milk powder Panel tests were carried out in order to examine confectioneries (biscuits) prepared for trial by the process as hereinbefore described. The comparison test was tested by 12 panelists and the results were shown in the following table.

TABLE 19

| Questions | Answers Sugarless biscuit containing the de-lactose milk U | No difference | Sugarless biscuit containing the de-lactose milk powder U |
| --- | --- | --- | --- |
| Which is tastier? | 1 person | 9 persons | 2 persons |
| Which feelings do you prefer? | 2 persons | 9 persons | 2 persons |
| Which scents do you like? | 3 persons | 7 persons | 2 persons |

Example 13

(1) Sugar-less milk coffee with use of the de-lactose milk powder

Sugar-less milk coffee with use of the de-lactose milk powder was prepared with the following recipe:

| | |
| --- | --- |
| coffee extract* | 500 ml |
| erythritol | 20 g |
| maltitol | 10 g |
| high performance sweetener | 0.1 g |
| de-lactose milk powder U | 40 g |
| milk ash minerals | 2 g |
| emulsifier | 0.1 g |
| sodium caseinate | 0.5 g |
| total (with addition of water) | 1000 ml | coffee extract*: roast coffee beans was pulverized, to be extracted with 600 ml of hot water before adjustment at pH 6.5 with sodium bicarbonate.

Erythritol, maltitol, high performance sweetener, the de-lactose milk powder U and milk ash minerals were added into 500 ml of hot water at 70° C. and well mixed, and the emulsifier and sodium caseinate were further added to be well stirred and mixed. 500 ml of the coffee extract obtained by extraction of coffee beans with hot water was added thereto to form the sugar-less milk coffee.

(2) Sugar-less milk coffee with use of the de-lactose milk

Sugar-less milk coffee with use of the de-lactose milk powder U was prepared with the same recipe and by the same process. The de-lactose milk U was added so as to be equivalent to the solid content included in the de-lactose milk powder U so that the total mount of coffee liquid is 1000 ml.

(3) Comparison test: Comparison of a product with use of the de-lactose milk to a product with use of the de-lactose milk powder Panel tests were carried out about drinks (coffee) prepared for trial by the process as hereinbefore described.

The comparison test was tested by 10 panelists and the results obtained were shown in the following table.

TABLE 20

| Questions | Answers | Suarless milk coffee containing the de-lactose milk U | No difference | Sugarless milk coffee containing the de-lactose milk powder U |
| --- | --- | --- | --- | --- |
| Which is tastier? | | 1 person | 8 persons | 1 person |
| Which sweetness do you like? | | None | 10 persons | None |
| Which scents do you like? | | 2 persons | 6 persons | 2 persons |

From the above results and the results of the candy and the ice as hereinbefore described, it was found that there is no difference in quality of products between when the de-lactose milk was used in confectionery, ice and drinks and when the de-lactose milk powder was used according to the present invention.

(4) Evaluation test of quality

For sugar-less biscuit and the sugar-less milk coffee, sugar alcohols were used to obtain light modish taste of plain sweetness which is different from when using sugar. About the sugar-less biscuit and the sugar-less milk coffee, the evaluation tests were carried out by the same panelists as hereinbefore described.

TABLE 21

| Sugarless biscuit | 5 | 4 | 3 | 2 | 1 |
| --- | --- | --- | --- | --- | --- |
| Quality of whole taste | 6 persons | 5 persons | 1 person | None | None |
| Quality of sweetness | 4 persons | 7 persons | None | None | None |
| Milk flavor | 2 persons | 5 persons | 5 persons | None | None |

| Sugarless milk coffee | 5 | 4 | 3 | 2 | 1 |
| --- | --- | --- | --- | --- | --- |
| Quality of whole taste | 6 persons | 6 persons | None | None | None |
| Quality of sweetness | 4 persons | 4 persons | 2 persons | None | None |
| Milk flavor | 7 persons | 3 persons | None | None | None |

5: Very good,
4: Good,
3: Normal,
2: Bad,
1: Very bad

Example 14

(1) Biscuit with use of the de-lactose milk powder

Sugar-less biscuit with use of the de-lactose milk powder was prepared for trial with the following recipe:

| | |
| --- | --- |
| weak flour | 100 parts |
| lactitol | 15 parts |
| erythritol | 5 parts |
| polydextrose | 5 parts |
| shortening | 30 parts |
| egg | 10 parts |
| de-lactose milk powder | 10 parts |
| inflating agent | 1.5 parts |
| salt | 1 part |
| vanilla flavour | 0.1 part |
| high performance sweetener | 0.15 parts |
| water | 5 parts |

Lactitol, erythritol, polydextrose, the high performance sweetener, the de-lactose milk powder and the flavour were well mixed with the shortening and dispersed for subsequent well mixing egg, salt dissolved in water and the inflating agent, creaming up at a high speed by the mixer to reach 0.75 specific gravity before the flour was finally added in order to prepare a dough.

The dough was shaped in any shape for baking at 2000° C. for 12 minutes in order to obtain a sugar-less biscuit.

(2) Comparison 1: Biscuit was prepared with the same recipe and by the same process as in Example 14 except using the regular whole milk powder in place of the de-lactose milk powder.

(3) Comparison 2: Biscuit was made with the same recipe and by the same process as in Example 14, except using in place of 10 parts of the de-lactose milk powder, 2.8 parts of extracted milk protein, 2.6 parts of butter oil, 3.6 parts of polydextrose and 0.5 part of whey minerals.

(4) Evaluation of sensory test: Evaluation of sensory tests were carried out about samples of Example 14, Comparisons 1 and 2 by 15 panelists.

TABLE 22

| Samples Questions | Biscuit of Example 14 | Biscuit of Comparative Example 1 | Biscuit of Comparative Example 2 |
|---|---|---|---|
| Which of the samples is tastiest? | 10 persons | 5 persons | None |
| Which of sweetness of the samples do you like best? | 7 persons | 5 persons | 3 persons |
| Which of scents of the samples do you like best? | 10 persons | 3 persons | 2 persons |
| Which of feelings of samples do you like better? | 7 persons | 7 persons | 1 person |

As results of the sensory tests, there was no difference between the biscuits of Example 14 and Comparison 1, but the biscuit of Comparison test 2 was inferior in hardness and roughness of taste.

In question of flavour, the biscuit of Example 14 received best evaluation and a sweetness of the sweetener used was adjusted to obtain the plain milk flavour. For Comparison 1, the heating smell of milk and the sweetness of the sweetener used was unbalanced and for Comparison 2, whole flavour was insufficient while greasy of butter was emphasized in the biscuit and thus both biscuits had unsuitable and unpreferable taste.

Example of Sugar-less Coffee

Reference 1

| coffee extract | 500 ml |
|---|---|
| erythritol | 20 g |
| maltitol | 10 g |
| stevia | 0.1 g |
| whole milk powder | 20 g |
| whey minerals | 2 g |
| emulsifier | 0.5 g |
| sodium caseinate | 0.5 g |
| total (with addition of water) | 1000 ml |

Whole milk powder, whey minerals, the emulsifier and sodium caseinate were added to 300 ml of hot water at 70° C. for mixing and subsequent addition with erythritol, maltitol and stevia. 500 ml of coffee extract was added for subsequent adjustment to pH 6.9 with sodium bicarbonate and to 1000 ml with water to form a Coffee drink ①.

Example 15

| coffee extract | 500 ml |
|---|---|
| erythritol | 20 g |
| maltitol | 10 g |
| stevia | 0.1 g |
| de-lactose milk powder U | 20 g |
| whey minerals | 2 g |
| emulsifier | 0.5 g |
| sodium caseinate | 0.5 g |
| total (with addition of water) | 1000 ml |

The de-lactose milk powder U, whey minerals, the emulsifier and sodium caseinate were added to 300 ml of hot water at 70° C. for mixing and subsequent addition of erythritol, maltitol and stevia. 500 ml of coffee extract was added for adjustment to pH 6.9 with sodium bicarbonate and to 1000 ml with water to form a coffee drink ②.

Reference 2

| coffee extract | 500 ml |
|---|---|
| erythritol | 20 g |
| maltitol | 10 g |
| stevia | 0.1 g |
| milk protein | 5 g |
| butter | 5 g |
| reites | 10 g |
| whey minerals | 2 g |
| emulsifier | 0.5 g |
| sodium caseinate | 0.5 g |
| total (with addition of water) | 1000 ml |

The milk protein, butter reites, whey minerals, the emulsifier and sodium caseinate were added to 300 ml of hot water at 70° C. for mixing and subsequent addition of erythritol, maltitol and stevia. 500 ml of coffee extract was added for adjustment to pH 6.9 with sodium bicarbonate and to 1000 ml with water to form a coffee drink ③.

Results of Investigation for Acceptability

Acceptability investigation was carried out with use of the coffee drinks ①, ② and ③ prepared in Examples. Panelists were 20 male and female who favor coffee, and the coffee drinks ①, ② and ③ were ranked from first to third according to the panelist's preference and scored 5 points, 3 points and 1 point from first to third, respectively, so that total points of the drinks were shown in the following table.

TABLE 23

|  | Coffee drinks ① | Coffee drinks ② | Coffee drinks ③ |
|---|---|---|---|
| Merit of scent | 62 marks | 62 marks | 56 marks |
| Coffee flavor | 54 marks | 72 marks | 54 marks |
| Milk flavor | 66 marks | 84 marks | 30 marks |
| Total grades | 66 marks | 82 marks | 32 marks |

Chronological Stability

The coffee drinks ①, ② and ③ were heated at 60° C. and then homogenized with 150 kg/cm² for bottling at 80°

C. before retort-disinfection was carried out at 121° C. for 20 minutes for observation of the chronological stability of the drinks at room temperature. As a result, it was found that although the drinks ①, ② and ③ were stable immediately after the retort-disinfection was carried out, after three days by, a ring of milk fat was observed at upper of the drink to demonstrate that the drink ③ becomes lack of the stability. It was also found that the coffee drinks ① and ② were more stable than the drink ③ and the drinks ① and ② have remained unchange in the stability even after two weeks.

We claim:

1. A process for preparing a de-lactose milk with
   (a) a fat comprising one or more milk fats selected from the group consisting of fresh cream, butter and butter oil, wherein the lactose content is less than 2%, and
   (b) a protein comprising one or more milk proteins selected from the group consisting of TMP (total milk protein), MPC (milk protein concentrate), casein, casein salts and WPC (whey protein concentrate), comprising the step of:
   (c) homogenizing the fat and the protein in an aqueous solution to a range from 0.33 to 3.0 of ratio of the fat to the protein (F/P) to emulsify the fat with the protein thereby forming a stable oil/water O/W emulsion.

2. The process for preparing a de-lactose milk according to claim 1, further comprising adding bulking agent consisting of soluble dietary fiber and/or sugar alcohol in a concentration of up to 2.5 of maximum ratio to a total solid amount of protein and the fat by weight, and wherein said bulking agent is one or more soluble dietary fibers and/or sugar alcohols selected from the group consisting of polydextrose, inulin, indigestible dextrin, lactitol, maltitol, isomaltitol and erythritol.

3. A process for preparing a de-lactose milk powder with
   (a) a fat comprising one or more milk fats selected from the group consisting of fresh cream, butter and butter oil, wherein the lactose content is less than 2%, and
   (b) a protein comprising one or more milk proteins selected from the group consisting of TMP (total milk protein), MPC (milk protein concentrate), casein, casein salts and WPC (whey protein concentrate), which comprises the steps of:
   (c) homogenizing the fat and the protein in an aqueous solution to a range from 0.33 to 3.0 of ratio of the fat to the protein (F/P) to emulsify the fat with the protein thereby forming a stable oil/water O/W emulsion; and
   (d) drying and powdering the oil/water emulsion obtained by said homogenization step.

4. Process according to claim 3, wherein a bulking agent of soluble dietary fiber and/or sugar alcohol is further added with content up to 2.5 of maximum ratio to a total solid amount of the fat and the protein by weight, and wherein preferably said bulking agent is one or more soluble dietary fibers selected from the group consisting of polydextrose, inulin, indigestible dextrin, lactitol, maltitol, isomaltitol and erythritol.

5. A de-lactose milk, which comprises:
   (a) a fat comprising one or more milk fats selected from the group consisting of fresh cream, butter and butter oil, wherein the lactose content is less than 2%; and
   (b) a protein comprising one or more milk proteins selected from the group consisting of TMP (total milk protein), MPC (milk protein concentrate), casein, casein salts and WPC (whey protein concentrate),
   wherein a ratio of the fat to the protein (F/P) is in the range from 0.33 to 3.0 and the fat is emulsified with the protein.

6. The de-lactose milk according to claim 5, wherein the de-lactose milk further contains a bulking agent consisting of soluble dietary fiber and/or sugar alcohol in content up to 2.5 of maximum ratio to a total solid amount of the fat and the protein by weight, and wherein said bulking agent comprises one or more soluble dietary fibers selected from the group consisting of polydextrose, inulin, indigestible dextrin, lactitol, maltitol, isomaltitol and erythritol.

7. The de-lactose milk according to claim 5 wherein said de-lactose milk is in the form of powder.

8. A foodstuff with de-lactose milk and/or de-lactose milk powder which comprises:
   (a) a fat comprising one or more milk fats selected from the group consisting of fresh cream, butter and butter oil, wherein the lactose content is less than 2%; and
   (b) a protein comprising one or more milk proteins selected from the group consisting of TMP, MPC, casein, casein slats and WPC,
   wherein a ratio of the fat to the protein (F/P) is in the range from 0.33 to 3.0 and the fat is emulsified with the protein.

9. The foodstuff according to claim 8, wherein said de-lactose milk and/or de-lactose milk powder further contains a bulking agent of soluble dietary fiber and/or sugar alcohol with content up to 2.5 of maximum ratio to a total solid amount of the fat and the protein by weight, and wherein said bulking agent comprises one or more dietary fibers and/or sugar alcohols selected from the group consisting of polydextrose, inulin, indigestible dextrin, lactitol, maltitol, isomaltitol and erythritol.

10. The foodstuff according to claim 8, wherein said foodstuffs is sugar-less.

11. The foodstuff according to claim 8, wherein said foodstuff is a chocolate.

12. The foodstuff according of claim 8, wherein said foodstuff is sugar-less milk chocolate which contains as sweetener one or more sugar alcohols selected from the group consisting of lactitol, isomaltitol and maltitol, and wherein said foodstuff contains one or more compounds selected from the group consisting of polydextrose, inulin, indigestible dextrin and sorbitol.

13. A sugar-less chocolate with de-lactose milk and/or de-lactose milk powder containing erythritol and/or xylitol comprising:
   (a) a fat comprising one or more milk fats selected from group of fresh cream, butter and butter oil, wherein the lactose content is less than 2%; and
   (b) a protein comprising one or more milk proteins selected from the group of TMP, MPC, casein, casein salts and WPC,
   wherein a ratio of the fat to the protein (F/P) is in the range from 0.33 to 3.0 and the fat is emulsified with the protein.

14. The sugar-less chocolate according to claim 13, wherein said de-lactose milk and/or de-lactose milk powder further contains a bulking agent of soluble dietary fiber and/or sugar alcohol with content up to 2.5 of maximum ratio to a total solid amount of the fat and the protein by weight, and wherein said bulking agent comprises one or more soluble dietary fibers and/or sugar alcohols selected from the group consisting of polydextrose, inulin, indigestible dextrin, lactitol, maltitol, isomaltitol and erythritol.

15. A de-lactose milk, which comprises:

(a) a fat comprising one or more milk fats selected from the group consisting of fresh cream, butter and butter oil, wherein the lactose content is less than 2%; and (b) a protein comprising one or more milk proteins selected from the group consisting of TMP, MPC, casein, casein salts and WPC.

wherein a ratio of the fat to the protein (F/P) is in the range from 0.33 to 3.0 and said fat and protein are homogenized in an aqueous solution and further the fat is emulsified with the protein thereby forming a stable oil/water O/W emulsion.

16. The de-lactose milk according to claim 15, wherein the de-lactose milk further contains a bulking agent of soluble dietary fiber and/or sugar alcohol with content up to 2.5 of maximum ratio to a total solid amount of the fat and the protein by weight, and wherein said bulking agent comprises one or more soluble dietary fibers and/or sugar alcohols selected from the group consisting of polydextrose, inulin, indigestible dextrin, lactitol, maltitol, isomaltitol and erythritol.

17. The de-lactose milk according to claim 15 wherein said de-lactose milk is in the form of powder.

18. A foodstuff with de-lactose milk and/or de-lactose milk powder, comprising (a) a fat including one or more milk fats selected from the group consisting of fresh cream, butter and butter oil, wherein the lactose content is less than 2%; and (b) a protein comprising one or more milk proteins selected from the group consists of TMP, MPC, casein, casein salts and WPC, wherein a ratio of the fat to the protein (F/P) is in the range from 0.33 to 3.0 and said fat and said protein are homogenized in an aqueous solution and further the fat is emulsified with the protein thereby forming a stable oil/water O/W emulsion.

19. A foodstuff according to claim 18, wherein said de-lactose milk also contains a bulking agent of soluble dietary fiber and/or sugar alcohol with content up to 2.5 of maximum ratio to a total solid amount of the fat and the protein by weight, and wherein said bulking agent comprises one or more soluble dietary fibers and/or sugar alcohols selected from the group consisting of polydextrose, inulin, indigestible dextrin, lactitol, maltitol, isomaltitol and erythritol.

20. The foodstuff according to claim 18, wherein the foodstuff is sugar-less.

* * * * *